(12) United States Patent
Flores Cortes et al.

(10) Patent No.: US 11,924,363 B2
(45) Date of Patent: Mar. 5, 2024

(54) DEVICE FOR DISPLAYING IMAGES CAPTURED BY A SMARTPHONE CAMERA IN REAL TIME IN ENLARGED FORM AND HIGHER RESOLUTION

(71) Applicant: Jaire Omar Flores Cortes, Tlaquepaque (MX)

(72) Inventors: Jaire Omar Flores Cortes, Tlaquepaque (MX); Samir Antonio Ipenza Retamozo, Tlaquepaque (MX); Luis Alfonso Delgado Rodriguez, Zapopan (MX); Hiram Gomez Villasenor, Tlaquepaque (MX); Luis Angel Oseguera Pardo, Tlaquepaque (MX); Josue Salomon Ipenza Retamozo, Tlaquepaque (MX)

( * ) Notice: Subject to any disclaimer, the term of this patent is extended or adjusted under 35 U.S.C. 154(b) by 190 days.

(21) Appl. No.: 17/440,177

(22) PCT Filed: Oct. 31, 2019

(86) PCT No.: PCT/MX2019/000116
§ 371 (c)(1),
(2) Date: Sep. 16, 2021

(87) PCT Pub. No.: WO2020/209708
PCT Pub. Date: Oct. 15, 2020

(65) Prior Publication Data
US 2022/0166863 A1  May 26, 2022

(30) Foreign Application Priority Data
Apr. 12, 2019 (MX) .................. MX/U/2019/000184

(51) Int. Cl.
*H04M 1/02* (2006.01)

(52) U.S. Cl.
CPC ....... *H04M 1/0266* (2013.01); *H04M 1/0262* (2013.01); *H04M 1/0264* (2013.01)

(58) Field of Classification Search
CPC ............. H04M 1/0266; H04M 1/0262; H04M 1/0264; G06F 1/1649
See application file for complete search history.

(56) References Cited

U.S. PATENT DOCUMENTS 5,105,338 A * 4/1992 Held ................. G06F 1/1628
708/110
6,778,383 B2 * 8/2004 Ho ..................... G06F 1/1607
361/679.04
(Continued)

FOREIGN PATENT DOCUMENTS

CN      204031308 U   12/2014
CN      207080781 U    3/2018
(Continued)

*Primary Examiner* — Ernest G Tacsik
(74) *Attorney, Agent, or Firm* — Alan F. Feeney

(57) ABSTRACT

The present invention relates to a device for displaying images captured by a smartphone camera in real time in enlarged form and higher resolution, characterized in that it consists of a hinged secondary screen that is in wired or wireless communication with a smartphone for the purpose of duplicating the image captured by the high- or low-resolution camera of the phone where it is anchored, the screen being mounted on a case housing the embedded electronics, the case being rotatably attached to a support element that allows it degrees of freedom to rotate together with the secondary screen by means of a rotation adjustment knob. According to the invention, the support element is adjoined, using attachment means, to a gripping and fastening element that acts as an anchor for securing and mounting on the smart phone, the device allowing the user to gain access to the display of the higher- or lower-resolution camera of the smartphone and to adjust the settings of the (Continued)

camera and the image in order to ensure better-quality photographs.

10 Claims, 4 Drawing Sheets

(56) References Cited

U.S. PATENT DOCUMENTS

| | | | |
|---|---|---|---|
| 9,229,474 B2* | 1/2016 | Gimpl | G09G 5/14 |
| 10,013,226 B2 | 7/2018 | Sirpal et al. | |
| 11,528,987 B1* | 12/2022 | Girault | G06F 1/1628 |
| 2004/0196209 A1* | 10/2004 | Chen | G06F 1/1601 |
| | | | 345/1.1 |
| 2009/0267866 A1* | 10/2009 | Reddy | G06F 3/1431 |
| | | | 345/1.1 |
| 2011/0228463 A1 | 9/2011 | Matagne | |
| 2013/0021757 A1* | 1/2013 | Shih | G06F 1/1656 |
| | | | 361/679.01 |
| 2015/0092329 A1* | 4/2015 | Balasundaram | G06F 1/1616 |
| | | | 361/679.09 |
| 2017/0150059 A1* | 5/2017 | Hattar | G06F 1/1618 |
| 2018/0129459 A1* | 5/2018 | Sylvan | G06F 3/1423 |
| 2019/0004764 A1* | 1/2019 | Son | G06F 1/1647 |
| 2019/0220630 A1* | 7/2019 | Siedow | G06K 7/10297 |
| 2019/0387084 A1* | 12/2019 | Lee | G06F 1/1647 |
| 2020/0133340 A1* | 4/2020 | Ou | H04M 1/0268 |

FOREIGN PATENT DOCUMENTS

| | | |
|---|---|---|
| CN | 108600604 A | 9/2018 |
| CN | 108682295 A | 10/2018 |
| EP | 2958308 A1 | 12/2015 |
| WO | WO-2018126729 A1 | 7/2018 |

* cited by examiner

DEVICE FOR DISPLAYING IMAGES CAPTURED BY A SMARTPHONE CAMERA IN REAL TIME IN ENLARGED FORM AND HIGHER RESOLUTION

CROSS-REFERENCE TO RELATED APPLICATIONS

This application is a continuation under 35 U.S.C. § 371 of International Application No. PCT/MX2019/000116 filed on Oct. 31, 2019 that claims priority to Mexican Application No. MX/u/2019/000184 filed on Apr. 12, 2029. The entire contents of each are incorporated herein by reference.

FIELD OF THE INVENTION

The present invention relates generally to the technical field of electronics, particularly to so-called "gadgets" or electronic devices that interact with smartphones. More specifically, it relates to a secondary screen for viewing images captured by a smartphone camera in enlarged form and in higher resolution.

BACKGROUND OF THE INVENTION

A variety of electronic apparatuses and devices currently exist which interact with smartphones in order to enhance same and perform certain functions.

On the other hand, smartphones have been evolving by leaps and bounds, with more and more functions, accessories, applications, and components being integrated which enable various actions to be carried out.

In general, smartphones comprise at least one camera of a certain resolution, with the most complete comprising a rear camera and a front camera, the rear camera with which the user takes pictures and video usually being the one with the highest resolution and the front camera being the one with the lowest resolution. Traditionally, users have tended to take photographs of themselves, or "selfies," using the front camera, which is the one with the lowest resolution, resulting in photographs that are usually of lower quality.

Until now, if one needed to take a photograph or video of oneself using the camera opposite the screen of the smartphone, the screen could not be seen while taking the photograph or recording; there is no option. Also, when one wishes to take photographs in high or low degrees of inclination, it is impossible to see on the display of the smartphone what is being taken or recorded due to the inclination of same. Because it does not have an external mirror screen offering movement so as to enable the image of the smartphone lens to be viewed. Since nowadays all screens are fixed in the direction opposite the higher-resolution camera and simultaneously to the same device, the freedom with which perfect viewing can be achieved when taking snapshots or making recordings using these smartphones is limited.

In an attempt to resolve this drawback, devices such as "selfie" sticks have been developed that comprise smartphone fastening elements and an elongated handle, the fastening element enabling the smartphone to be held in such a position that allows selfies to be taken from a greater distance; however, it is always necessary to use the lower-resolution camera; and although it is possible to use the higher-resolution rear camera, it is not possible to center the photograph easily because the user is far away, nor is it easy to manipulate the phone in order to adjust some properties of the camera to improve the image of the photograph.

It is the primary purpose of the present invention to make a device available with which, by means of a screen that is secondary to the one that every smartphone already has, the user can access the display of the higher-resolution camera of the smartphone, which is almost always in the direction contrary to the screen thereof. And this device will make it possible to see at all times how the photographs and recordings will be and to overcome any obstacle when taking photographs or recordings with the higher-resolution camera of the smartphone.

A search was carried out in order to determine the closest state of the art, and the following documents were found.

U.S. Pat. No. 10,013,226 B2 by Sanjiv Sirpal and Mohammed Selim of Aug. 7, 2015 discloses methods and devices for selectively presenting a user interface on a second screen. More particularly, the method includes a change in the display mode of a multi-screen device from a first screen to a second screen while the device is closed. The change in display mode may have been made in response to a request from an application. The application can run and move the UI window associated with the application to a second screen. The switch to the second screen can be requested as a function of the application or generated automatically, depending on the type of application. In response to the application request, the device can render the user interface on the second screen. However, this document does not disclose an external screen that can be attached to any smartphone that allows wireless communication in order to reproduce the mirror image that the camera of the smartphone is taking; therefore, it does not affect this invention.

CN108682295 A by Zheng Yadong et al. of May 29, 2018 discloses a display device and relates to the technical field of image display devices. The display device comprises a display module; the display module comprises a photopermeability display panel, a photopermeability cover covering the front of the display panel, and an image sensor, with at least one of the display panels and the photopermeability cover plate being a lens structure that can collect incident light; the image sensor is arranged at the rear of the display panel and is used to collect information from the light collected by the lens structure. The invention additionally provides a mobile terminal comprising the above display device. The mobile terminal has a simple structure: The display panel or the photopermeability cover plate is organized as the lens structure that can collect light, and the arrangement of "a front-shaped part" of the mobile terminal is omitted, making it possible for full screen to really be achieved and enabling a user to shoot visually in real time, thus making the selfie effect more natural.

However, that document does not disclose an external screen that can be attached to any smartphone that allows communication via wireless in order to reproduce the image as a mirror that the camera of the smartphone is taking; therefore, it does not affect this invention.

Patent CN108600604 by Jia Zhou of Feb. 10, 2018 discloses a photography method that is used for a dual-screen mobile terminal. The method comprises the steps of: controlling a rear camera in order to capture an object image, performing the previewing and displaying of the collected object image on a main screen, and controlling an auxiliary display in order to reproduce a preset audio/video/image. According to the invention, the method controls the auxiliary screen in order to reproduce the preset video/image/audio according to a photographed object, thereby achieving attractive photography of the photographed object. On the one hand, the photography scene can be extended to more occasions from a selfie mode; on the other hand, the method greatly improves the control assistance for the photographed object while photographing and improves the effect and quality of the photography.

However, that document does not disclose an external screen that can be attached to any smartphone that allows wireless communication in order to reproduce the image as a mirror that the camera of the smartphone is taking; therefore, it does not affect this invention.

None of the aforementioned documents allows for setting up, connecting to, and interacting with a screen that is secondary to the one that each smartphone already has, enabling the user to access the display of the higher-resolution camera of the smartphone as achieved by the present invention.

OBJECT OF THE INVENTION

It is the main object of the present invention to provide a device for displaying images captured by a smartphone camera in real time in enlarged form and higher resolution in which the camera is the one with the highest or the lowest resolution and allows the user to see at all times how the photographs and recordings will turn out.

It is another object of the invention to provide a device for displaying images captured by a smartphone camera in real time in enlarged form and higher resolution that also enables the user to access the display of the camera of higher or lower resolution of the smartphone and to adjust certain camera and image properties in order to ensure better-quality photographs.

It is another object of the invention to provide a device for displaying images captured by a smartphone camera in real time in enlarged form and higher resolution that also makes it possible to duplicate the cell phone screen in order to enable the higher-resolution camera of the cell phone to be used while viewing the image in a different position, thus making it possible to take photographs in certain situations and at closed and open angles wirelessly.

It is another object of the invention to provide a device for displaying images captured by a smartphone camera in real time in enlarged form and higher resolution that is also structurally simple, practical and functional, easy to install, easily maneuverable, and has a simple and functional structure.

It is another object of the invention to provide a device for displaying images captured by a smartphone camera in real time in enlarged form and higher resolution that also makes it possible to take images and video at different angles and to display the image on which the lens of the smartphone is focusing in real time before the photograph and/or the video is taken and provides the user with more options for using the higher-resolution camera, ranging from self-shots or selfies to video shots.

And all of these features and objects will become apparent from a general and detailed description of the present invention with reference to the illustrated embodiments.

BRIEF DESCRIPTION OF THE INVENTION

In general, the device for displaying images captured by a smartphone camera in real time in enlarged form and higher resolution consists of a hinged secondary screen that is in wired or wireless communication with a smartphone for the purpose of duplicating the image captured by the high-resolution camera of the phone where it is anchored, the screen being mounted on a case where an electronic card that includes a microcontroller with software and an application is embedded, the case being rotatably attached to a support element that allows degrees of freedom to the case where the screen is mounted by means of a rotation adjustment knob. According to the invention, the support element is adjoined, using attachment means, to a gripping and fastening element that acts as an anchor for securing and mounting on the smart phone.

In the preferred embodiment of the invention, the gripping and fastening element consists of a rigid and malleable metal core or other similar resistant rigid material that is lined with a cover made of leather or synthetic material, the metal core providing rigidity and support and comprising, above and below, either some grip protrusions that have the ability to bend in order to conform to the body of the smartphone and unfold without breaking in order to detach from the smartphone or hinged protrusions that can be rotated in one direction in order to conform to—or in the other direction in order to separate from—the body of the smartphone. The device makes it possible to provide a better option to any person and user from housewives to professional photographers, architects, engineers, etc., who wishes to take pictures and videos from their smartphone, a continuous display at any shooting angle. And, consequently, it always provides a better option when taking self-shots and/or "selfies," always knowing and not losing sight of how they will be captured in the photograph of each indicated and captured object, from their higher- or lower-resolution lens of their smartphone.

In each photograph made from the smartphone lenses, they can be viewed like a mirror through the screen of the device according to the present invention, which provides more mobility when taking certain angles that previously could not be made and seen simultaneously.

The hinged secondary screen that is mounted on the case has the ability to rotate a certain number of degrees from the back or front of the body of the smartphone to the lower front or rear thereof, thereby affording the user the opportunity to observe the image that is to be captured.

The hinged secondary screen duplicates the image of the smartphone in real time for the purpose of enabling the camera of the smartphone to be used while viewing the image in a different position, thus making it possible to take pictures in certain situations and from high and low angles, depending on the arrangement of the device relative to the smartphone. And this in a wired or wireless manner, preferably through Wi-Fi communication of no more than 100 milliseconds between image transmission from the smartphone to the secondary screen of the device.

This gripping and fastening element that acts as a clip-type anchor to be attached to and mounted on the smartphone is configured so as to be able to be attached to and mounted on the vast majority of sizes and brands of smartphone that exist today.

In another of the embodiments of the invention, the device for displaying and replicating images captured by a camera of a smartphone in real time also comprises at least one battery for powering the electronic components of the electronic card and, optionally, for powering the smartphone on which it is mounted, when required.

In order to better understand the features of the invention, the present description is accompanied by the drawings described below, which form an integral part thereof and are of an illustrative but non-limiting nature.

Figure 1:
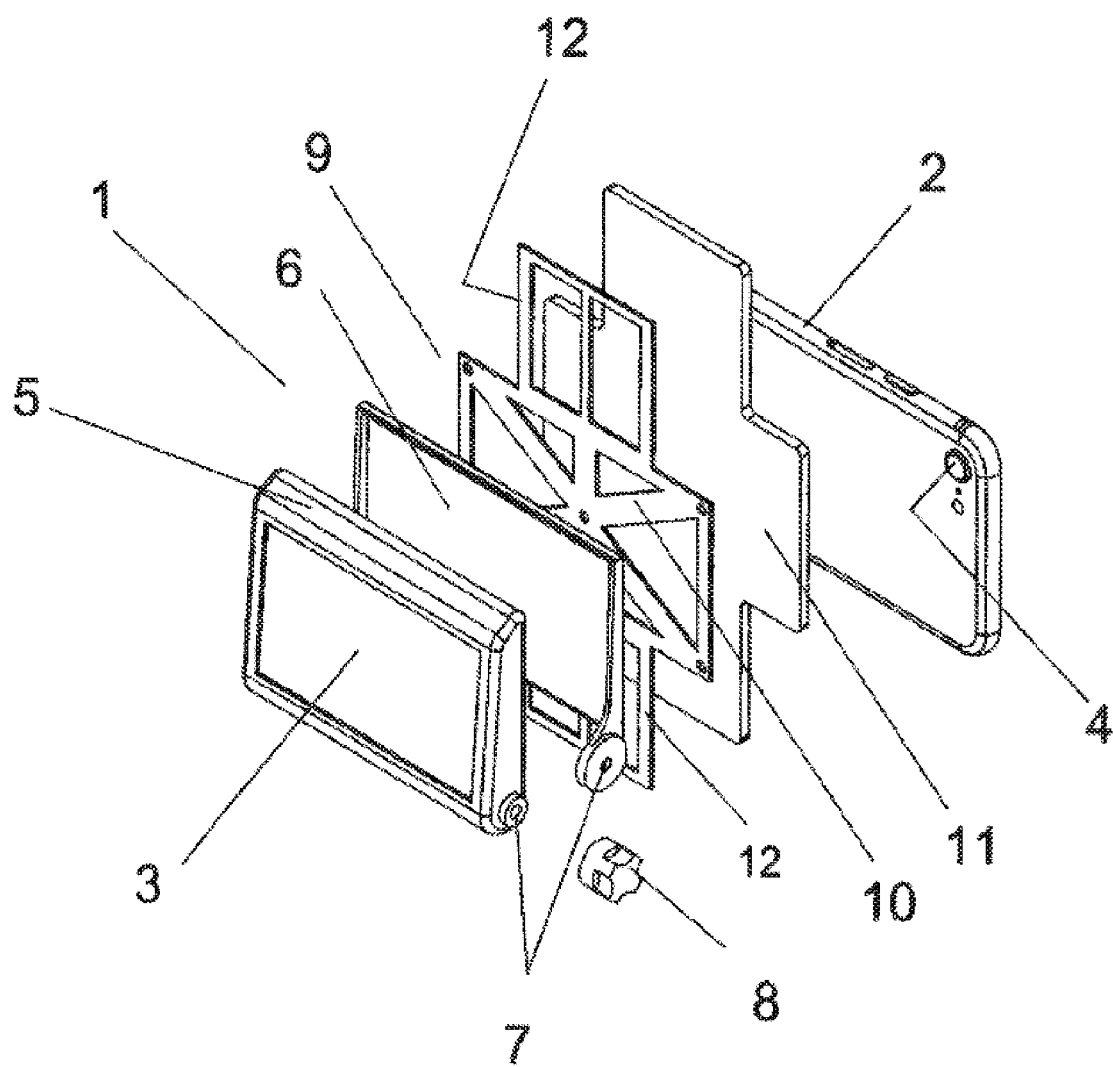
FIG. 1 shows an exploded view of the device for displaying images captured by a smartphone camera in real time in enlarged form and higher resolution.

In order to facilitate understanding of the invention, a detailed description of some of the embodiments thereof as depicted in the drawings, which are appended to the present invention for illustrative but non-limiting purposes, will now be provided.

DETAILED DESCRIPTION OF THE INVENTION

The characteristic details of the device for displaying images captured by a smartphone camera in real time in enlarged form and higher resolution are clearly elucidated in the following description and in the accompanying illustrative drawings, with same reference signs serving to denote the same parts.

Referring to FIG. 1, the device (1) for displaying images captured by a camera (4) of a smartphone (2) in real time in enlarged form and higher resolution consists of a secondary screen (3) that is hinged and in wired or wireless communication with the smartphone (2) for the purpose of duplicating the image captured by the camera (4) (preferably the high resolution camera) of the smartphone (2) where it is anchored, the secondary screen (3) being mounted on a case (5) where the electronics are housed and embedded (not shown); the case (5) is rotatably secured to a support element (6) through attachment means (7) that allow degrees of freedom of rotation to the case (5) where the secondary screen (3) is mounted by means of a rotation adjustment knob (8); and the support element (6) is attached and secured using attachment means (not shown) in a gripping and fastening element (9) that acts as a clip-like anchor to be fastened and mounted on the body of the smartphone (2).

The gripping and fastening element (9) consists of a metal core (10) that is lined with a cover (11) made of leather or synthetic material, the metal core (10) providing rigidity and support and comprising, above and below, some gripping projections (12) that have the ability to bend in order to conform to the body of the smartphone (2) and unfold without breaking in order to detach from the smartphone (2).

Figures 2, 3:
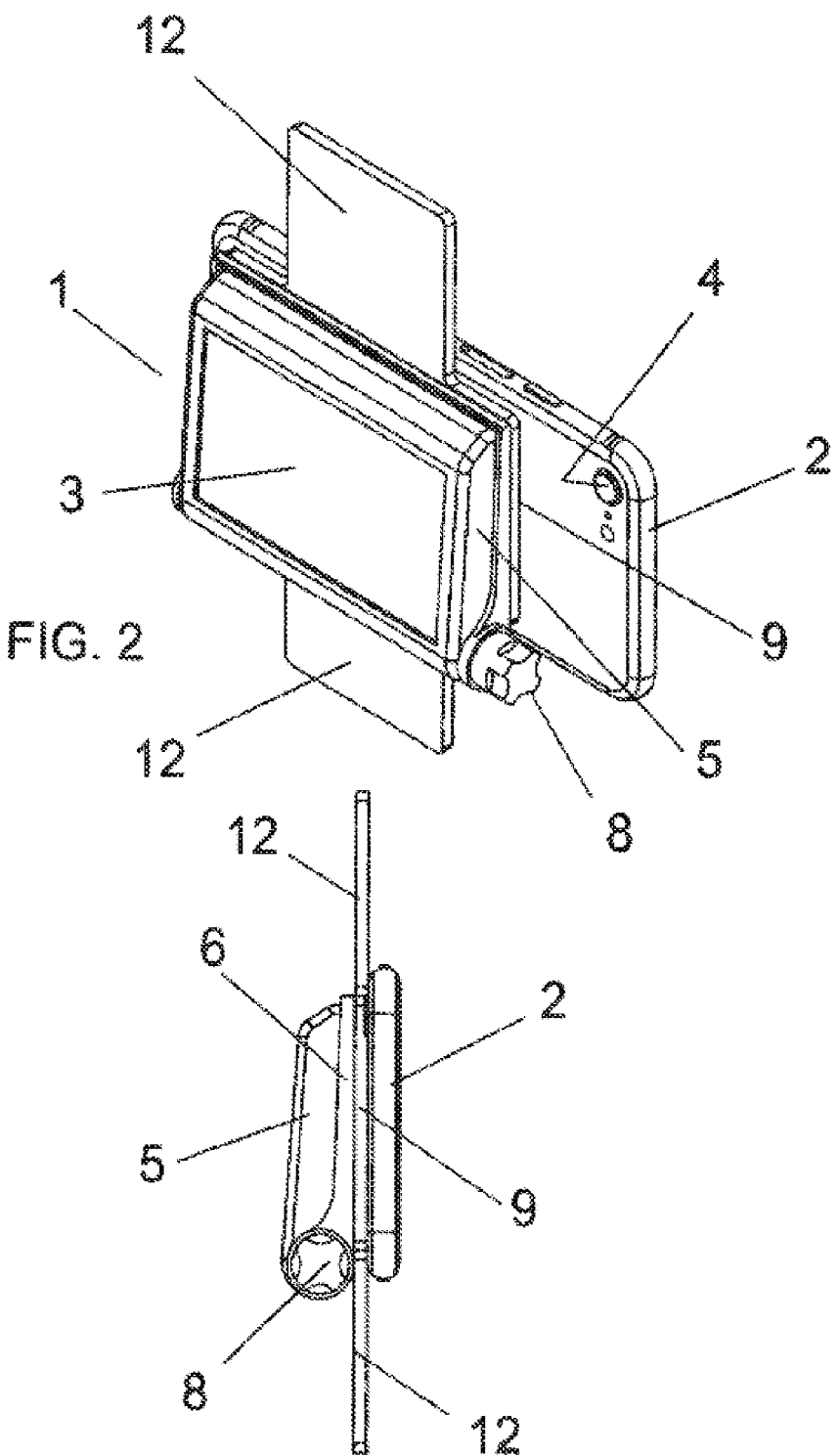
FIG. 2 shows a front perspective view of the device for displaying images captured by a smartphone camera in real time in enlarged form and higher resolution before being mounted on a smartphone.
FIG. 3 shows a side view of the device for displaying images captured by a smartphone camera in real time in enlarged form and higher resolution before being mounted on a smartphone.

With reference to FIGS. 2 and 3, which show a front and side perspective view, respectively, of the device (1) for displaying images captured by a camera (4) of a smartphone (2) in real time in enlarged form and higher resolution before being mounted on the smartphone (2), it can be seen that the upper and lower gripping projections (12) of the gripping and fastening element (9) are arranged in a vertical position before bending to conform to the device (1) that is attached to one side of the body of the smartphone (2). In this representation, the secondary screen (3) is completely in a vertical position connected to the case (5), the latter with a support element (6) and the latter, in turn, with the gripping and fastening element (9) from where the gripping projections (12) project above and below.

Figure 4:
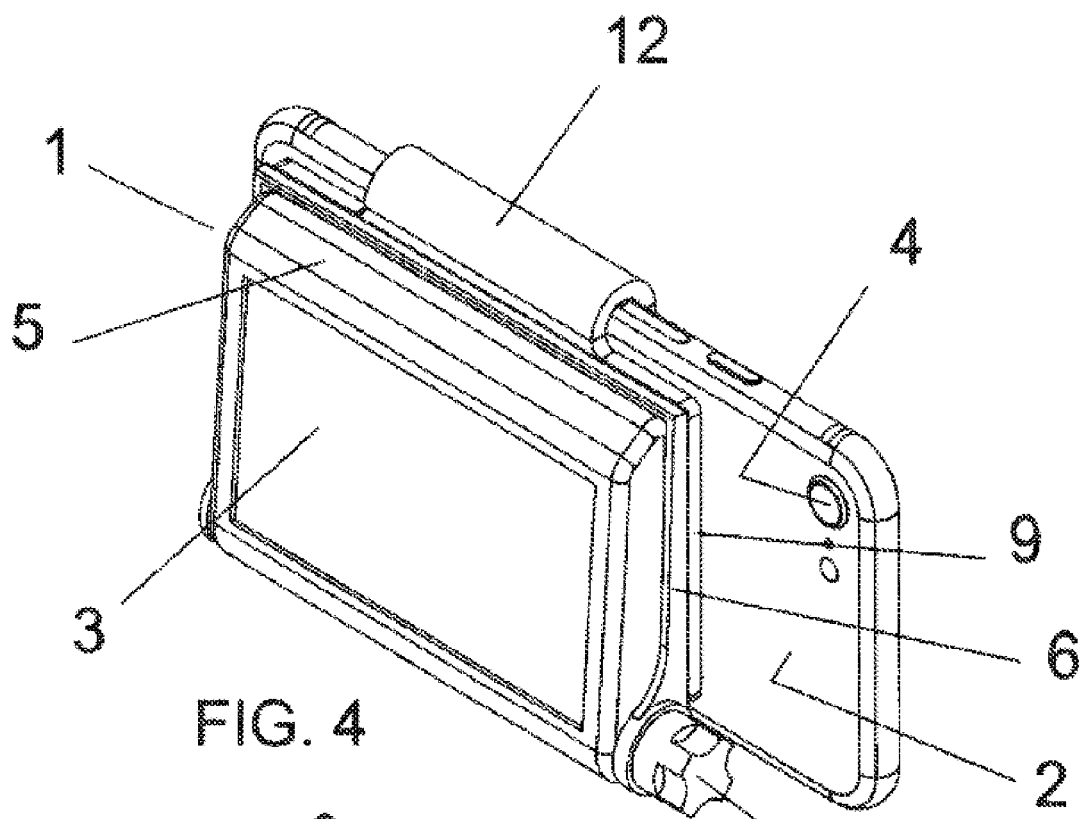
FIG. 4 shows a front perspective view of the device for displaying images captured by a smartphone camera in real time in enlarged form and higher resolution mounted on a smartphone.
Figure 5:
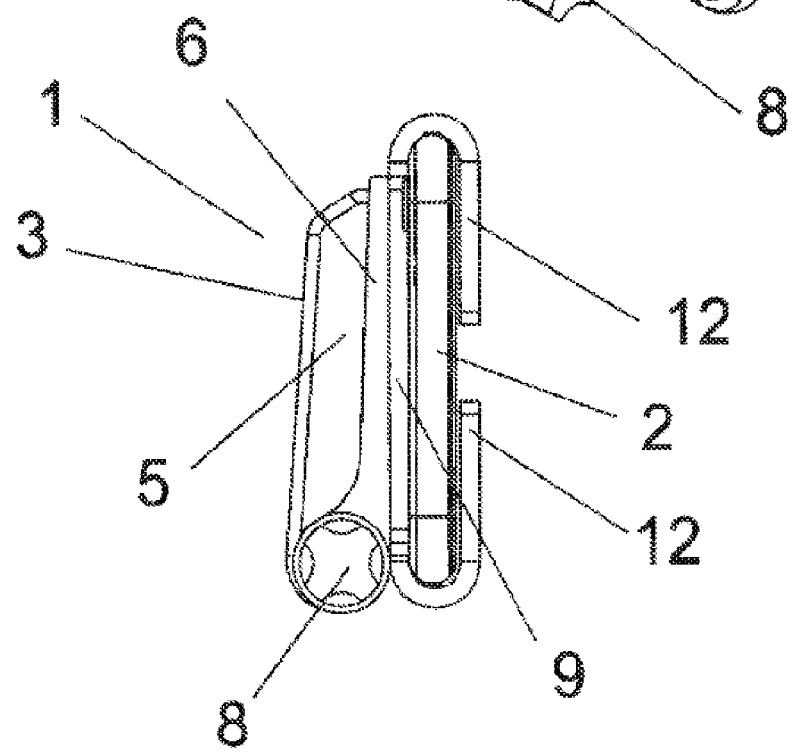
FIG. 5 shows a side view of the device for displaying images captured by a smartphone camera in real time in enlarged form and higher resolution mounted on a smartphone.

With reference to FIGS. 4 and 5, the same numerical references are used in these figures to indicate the same parts that are illustrated and described in FIGS. 2 and 3, with the addition that the upper and lower gripping projections (12) of the gripping and fastening element (9) have been bent in order to conform to the body of the smartphone (2), thereby attaching to the latter the device (1) for displaying images captured by a camera of a smartphone (2) in real time in enlarged form and higher resolution.

Figure 6:
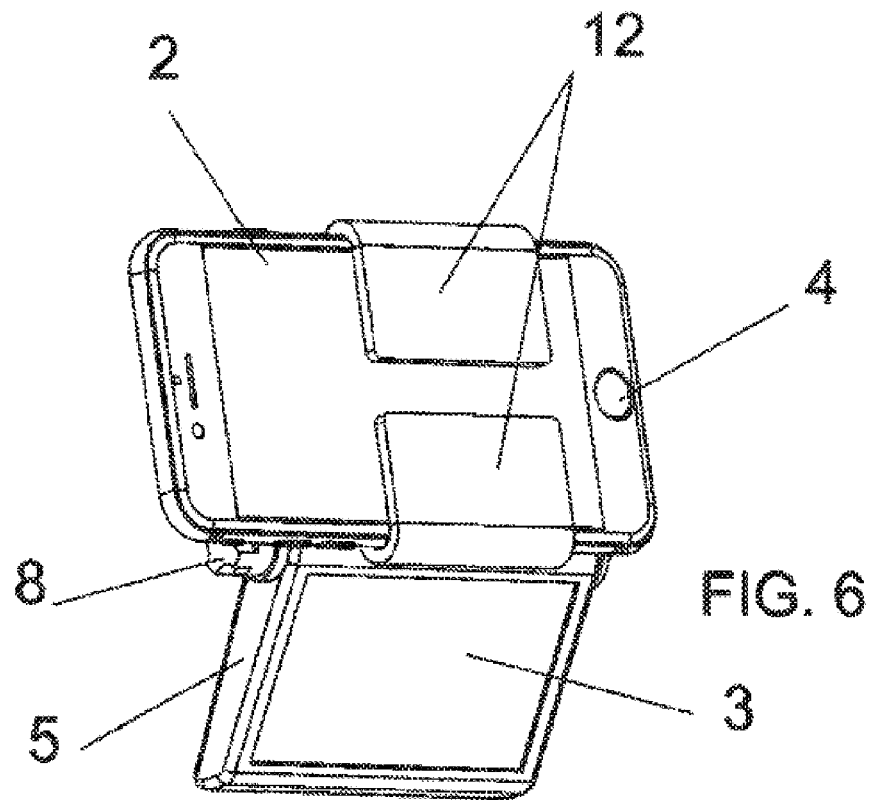
FIGS. 6 and 7 show front and rear perspective views, respectively, of the device for displaying images captured by a smartphone camera in real time in enlarged form and higher resolution mounted on a smartphone, showing different positions of the hinged secondary screen and is in wired or wireless communication with a smartphone.
Figure 7:
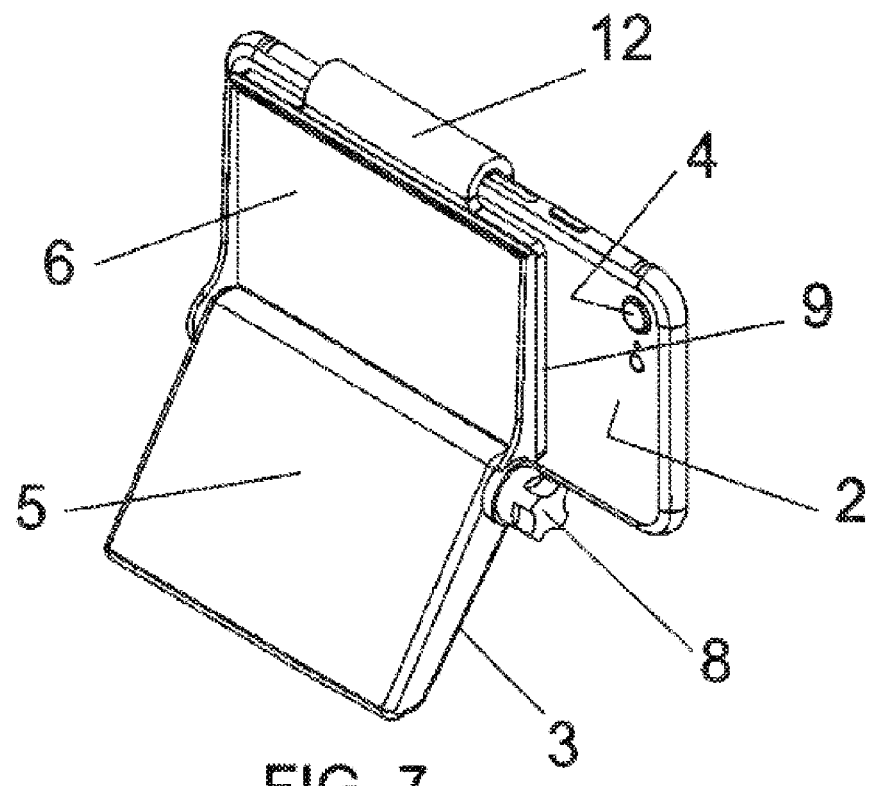

With reference to FIGS. 6 and 7, the same numerical references are used in these figures to indicate the same parts that are illustrated and described in FIGS. 2 to 5, with the addition that the case (5) where the secondary screen (3) is attached can be rotated into different positions by operating the rotation adjustment knob (8) in order to be able to move the secondary screen (3) that allows access to different high and low angles depending on the accommodation of the device (1), as well as the rotation or viewing of the images on the secondary screen (3) acting as a mirror.

The user of the smartphone (2) in which the device (1) of the present invention is incorporated can take photographs and recordings, can see him- or herself on the secondary screen (3) when they wish to take a selfie with their camera that is opposite the smartphone screen (2), which is almost always the one with the highest image quality, and second, can take photographs from high or low angles without losing sight of the image through the secondary screen (3) with movement away from, or greater inclination of, the smartphone lens.

The invention has been described sufficiently so as to enable a person of ordinary skill in the art to reproduce and obtain the results mentioned in the present invention. Despite the fact that any person skilled in the field of the art that is concerned with the present invention may be able to make modifications that are not described in the present application, if the subject matter claimed in the following claims is required for the application of these modifications in a certain structure or in the manufacturing process thereof, said structures must be included within the scope of the invention.

What we claim is:

1. A device for displaying and replicating images, in real time, captured by a smartphone having a camera and a primary screen, comprising:
   a hinged secondary screen that is in wired or wireless communication with the smartphone for the purpose of duplicating the image captured by the camera of the smartphone;
   a case on which the hinged secondary screen is mounted;
   an electronic card including a microcontroller with software and an application that operates the hinged secondary screen housed in the case;
   a support element rotatably attached to the case;
   a rotation adjustment knob attached to the support element using attachment means that is designed to rotate the case on which the hinged secondary screen is mounted;
   a gripping and fastening element affixed to the support element, wherein the gripping and fastening element is a clip-type anchor designed to secure the device for displaying and replicating images captured by a smartphone to the smartphone; and wherein the gripping and fastening element consists of a rigid and malleable supporting core with a malleable cover having upper and lower gripping projections, wherein the gripping and fastening element is designed to bend to allow the gripping and fastening element to fold over the smartphone to attach the device to the smartphone and to, unbend the gripping and fastening element in order to detach the gripping and fastening element from the smartphone when not in use.

2. The device for displaying and replicating images captured by a smartphone camera, in real time, according to claim 1, wherein the malleable cover affixed to the malleable supporting core comprises hinged upper and lower projections that are designed to bend around the smartphone in one direction to affix the device to the smartphone, and to unbend in the opposite direction to detach the device from the smartphone on which the device is anchored.

3. The device for displaying and replicating images captured by a smartphone camera, in real time, according to claim 2, further comprising at least one battery for powering the electronic card, the smartphone on which the device for displaying and replicating images is mounted, or both.

4. The device for displaying and replicating images captured by a smartphone camera, in real time, according to claim 1, further comprising at least one battery for powering the electronic card, the smartphone on which the device for displaying and replicating images is mounted, or both.

5. The device for displaying and replicating images, in real time, captured by a smartphone according to claim 1, wherein said rigid, supporting core is manufactured from a resistant rigid material.

6. The device for displaying and replicating images, in real time, captured by a smartphone according to claim 5, wherein the resistant rigid material is metal.

7. The device for displaying and replicating images, in real time, captured by a smartphone according to claim 1, wherein the cover lining the rigid supporting core is manufactured using a synthetic material.

8. The device for displaying and replicating images, in real time, captured by a smartphone according to claim 1, wherein said cover is manufactured using leather.

9. The device for displaying and replicating images, in real time, captured by a smartphone according to claim 1, wherein the attachment means is formed by corresponding washer-like protrusions affixed to the case and the support element;

wherein the washer-like protrusions contain central bore holes;

wherein when the device is assembled, the bore holes forged in the washer-like protrusions align;

wherein the adjustment knob is inserted through the bore holes and is rotatably attached to the device and is capable of rotating the support element attached to the case.

10. The device for displaying and replicating images, in real time, captured by a smartphone according to claim 1, wherein the gripping and fastening element is affixed to the support element using screws.

* * * * *